United States Patent
Krink et al.

(10) Patent No.: US 9,244,242 B2
(45) Date of Patent: Jan. 26, 2016

(54) OPTICAL CABLE ASSEMBLY, AN OPTICAL MODULE, AND A METHOD FOR MOUNTING AN OPTICAL CABLE ASSEMBLY TO AN OPTICAL MODULE

(71) Applicant: FCI, Guyancourt (FR)

(72) Inventors: Andreas Krink, Berlin (DE); Alexander Eichler-Neumann, Berlin (DE); Alexandre Lasalle, Guyancourt (FR); Michael Richter, Guyancourt (FR)

(73) Assignee: FCI, Guyancourt (FR)

( * ) Notice: Subject to any disclaimer, the term of this patent is extended or adjusted under 35 U.S.C. 154(b) by 67 days.

(21) Appl. No.: 14/345,260

(22) PCT Filed: Sep. 17, 2012

(86) PCT No.: PCT/EP2012/003874
§ 371 (c)(1),
(2) Date: Mar. 17, 2014

(87) PCT Pub. No.: WO2013/037501
PCT Pub. Date: Mar. 21, 2013

(65) Prior Publication Data
US 2014/0348473 A1    Nov. 27, 2014

(51) Int. Cl.
*G02B 6/38* (2006.01)
*G02B 6/42* (2006.01)
*G02B 6/44* (2006.01)

(52) U.S. Cl.
CPC ............ *G02B 6/4471* (2013.01); *G02B 6/3887* (2013.01); *G02B 6/424* (2013.01); *G02B 6/4248* (2013.01); *G02B 6/3897* (2013.01); *G02B 6/4292* (2013.01); *Y10T 29/49826* (2015.01)

(58) Field of Classification Search
CPC .. G02B 6/3887; G02B 6/3897; G02B 6/4248; G02B 6/424; G02B 6/4471; G02B 6/4292; Y10T 29/49826
USPC .................................. 385/90–98, 100; 29/428
See application file for complete search history.

(56) References Cited

U.S. PATENT DOCUMENTS

| | | | |
|---|---|---|---|
| 4,114,979 A * | 9/1978 | Heldt | 385/87 |
| 4,964,685 A | 10/1990 | Savitsky et al. | 350/96.2 |
| 5,222,169 A * | 6/1993 | Chang et al. | 385/87 |
| 6,979,133 B2 * | 12/2005 | Montena | 385/80 |

FOREIGN PATENT DOCUMENTS

| | | |
|---|---|---|
| CN | 101652690 A | 2/2010 |
| EP | 0 340 728 | 11/1989 |
| JP | H01250910 A | 10/1989 |

* cited by examiner

*Primary Examiner* — Akm Enayet Ullah
(74) *Attorney, Agent, or Firm* — Harrington & Smith

(57) ABSTRACT

An optical cable assembly is provided, an optical cable provided with one or more optical fibers, a strain-relieve device mounted on the optical cable and configured to provide a strain relieve when the optical cable is fed into an optical module through an opening in a housing of the optical module, wherein the strain-relieve device is provided with an adjustment mechanism configured to adjust a distance between an end portion of the one or more optical fibers and the strain-relieve device. Furthermore, an optical module and a method for assembling an optical cable assembly are provided.

13 Claims, 4 Drawing Sheets

OPTICAL CABLE ASSEMBLY, AN OPTICAL MODULE, AND A METHOD FOR MOUNTING AN OPTICAL CABLE ASSEMBLY TO AN OPTICAL MODULE

BACKGROUND

1. Technical Field

The exemplary and non-limiting embodiments of the invention relate generally to the field of technologies of an optical cable assembly configured to be connected to an optical module.

2. Brief Description of Prior Developments

Such optical cable assemblies are used for connecting an optical cable to an optical module which in turn is provided with one or more optical functional elements, for example an optical coupling unit to which an end portion of one or more optical fibers of the optical cable may be connected, for example, by a pluggable ferrule. In general, the optical cable assembly may be used for feeding or guiding one or more optical fibers of the optical cable through an opening of the housing of the optical module. In order to avoid damage to the optical cable as whole and/or the optical fiber(s) of the cable, it was proposed to provide the optical cable assembly with a strain-relieve device which would mechanically couple to the housing of the optical module.

U.S. Pat. No. 5,222,169 discloses an optical fiber connector assembly. Optical fiber cables have strength members or aramid yarn. When the cable is connected to a connector, the strength member is also terminated.

SUMMARY

The following summary is merely intended to be exemplary. The summary is not intended to be limiting.

It is an object of the invention to provide improved technologies for an optical cable assembly to be used for coupling an optical cable to an optical module.

In accordance with one aspect, an optical cable assembly is provided comprising an optical cable provided with one or more optical fibers, and a strain-relieve device mounted on the optical cable and configured to provide a strain relieve when the optical cable is fed into an optical module through an opening in a housing of the optical module. The strain-relieve device is provided with an adjustment mechanism or arrangement configured to adjust a distance between an end portion of the one or more optical fibers and the strain-relieve device.

In accordance with another aspect, an optical module is provided comprising a housing, a functional optical element received in the housing, and an optical cable assembly, the optical cable assembly being fixed to the housing. The strain-relieve device is fixed to the housing, thereby feeding the optical cable into the housing through an opening in the housing.

In accordance with still another aspect, a method for assembling an optical cable assembly is provided. The method comprises steps of providing an optical cable comprising one or more optical fibers, providing a strain-relieve device and mounting the strain-relieve device on the optical cable, where the strain-relieve device is configured to provide a strain relieve when the optical cable is fed into an optical module through an opening in a housing of the optical module, and adjusting a distance between an end portion of the one or more optical fibers of the optical cable and the strain-relieve device by the adjusting mechanism.

An adjustment mechanism or arrangement is provided which is configured to provide the option for adjustment of the distance between the end portion of the one or more optical fibers of the optical cable and a strain-relieve devise which is to be assembled or fixed to the housing of an optical module. By the adjustment mechanism, the optical cable assembly can be configured for different optical modules having need for different extensions of the optical fibers extending into the inner space of the optical module. Also, by the adjustment mechanism, the optical cable assembly can be adjusted to optical modules provided with a different configuration within tolerances due to manufacturing process.

The end portion of the one or more optical fibers may be received in a ferrule configured to be connected to or received in a plug-in of the optical module.

The adjustment mechanism may be provided with a fine adjustment, e.g. a fine thread.

The adjustment mechanism may be provided with a rotation adjustment mechanism. The rotation adjustment mechanism may be provided with a screw rotation adjustment mechanism which may be provided with a fine thread portion.

It may be provided that the optical cable is located a channel provided in the strain-relieve device, and that the strain-relieve device comprises an adjustment member which is, in relation to the end portion of the one or more optical fibers, movable along the longitudinal axis of the optical cable.

The adjustment member may be pivotably or rotatably supported. The pivotable adjustment member may be movable along the longitudinal axis of the optical cable by rotating the adjustment member. The adjustment member may be pivotably or rotatably supported on a threaded portion of the adjustment mechanism.

The adjustment member may be movably received on or in a cable jacket of the optical cable. The adjustment member may be provided with a cylindrical portion in part or completely received in or resting on the optical cable. There may be a threaded portion provided on the adjustment member interacting with the optical cable, e.g. the cable's jacket, thereby, establishing a screw rotation adjustment mechanism. The adjustment member may be rotated for moving the adjustment member in relation to the end portion of the one or more optical fibers along the longitudinal axis of the optical cable.

The adjustment member may be movably received on a further member of the strain-relieve device which is fixed to the optical cable. The further member may be fixed to the optical, e.g. directly or indirectly to the cable jacket of the optical cable. The further member may be provided with cylindrical portion in part or completely received in or resting on the optical cable. For example, the further member may be fixed to the optical cable by a shrink sleeve.

The method for assembling the optical cable assembly may further comprise a step of fixing the adjusting mechanism after the step of adjusting the distance between the end portion of the one or more optical fibers of the optical cable.

The method may further comprise a step of mounting the optical cable assembly to an optical module by fixing the strain-relieve device to a housing of the optical module, thereby feeding the optical cable through an opening in the housing. This may provide a method for mounting an optical cable assembly to an optical module.

BRIEF DESCRIPTION OF THE DRAWINGS

The foregoing aspects and other features are explained in the following description, taken in connection with the accompanying drawings, wherein.

DETAILED DESCRIPTION OF EMBODIMENT

Figure 1:
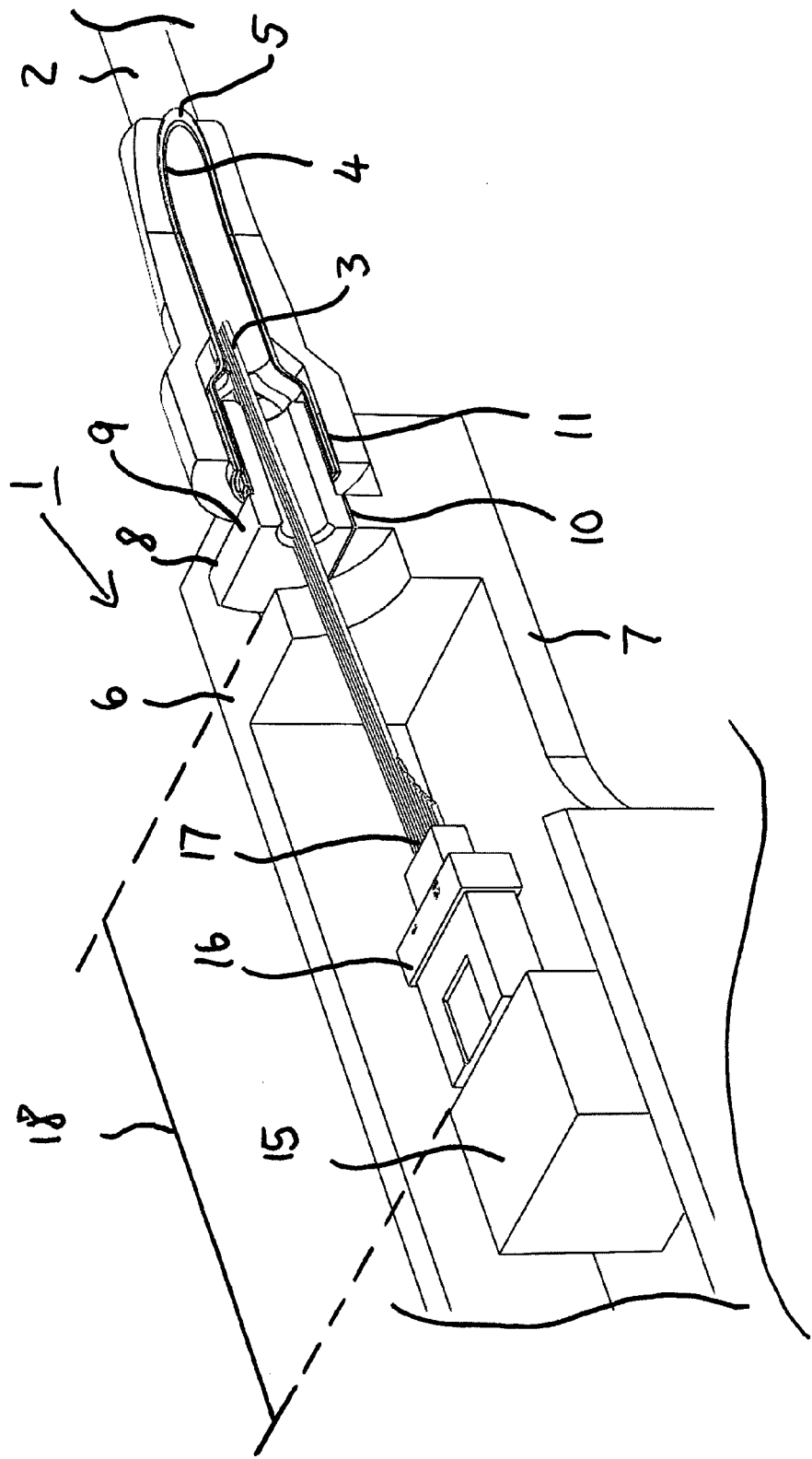
FIG. 1 is a perspective view of an optical module connected to an optical cable.
Figure 2:
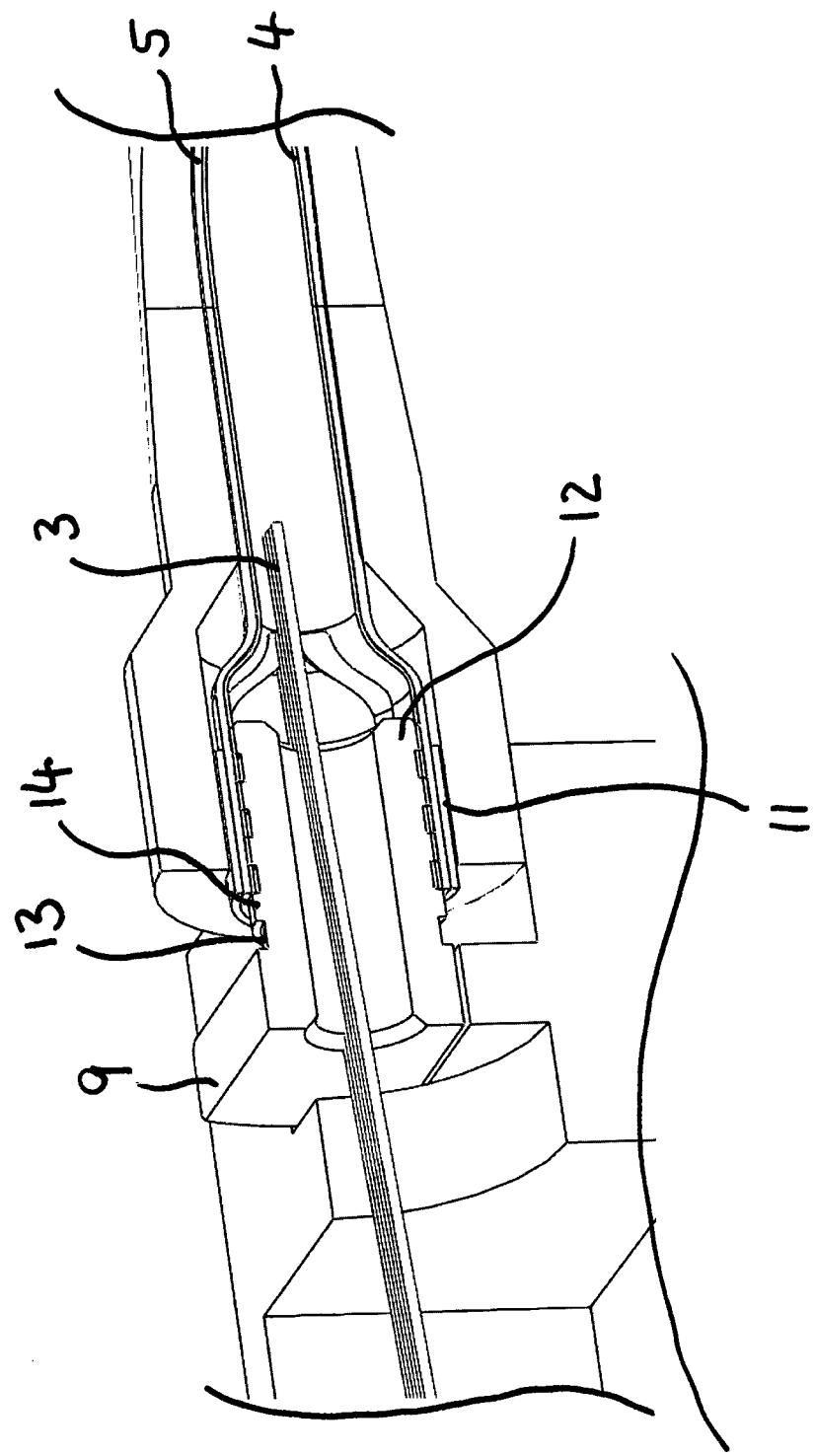
FIG. 2 is an exploded view of the optical module shown in FIG. 1.

Referring to FIGS. 1 and 2, there are shown schematic representations of an optical cable assembly 1 comprising an optical cable 2 with a plurality of optical fibers 3 surrounded by an aramid-fiber 4 and an outer jacket 5. The optical cable assembly 1 is fixed to a housing 6 of an optical module 7. A strain-relieve device 8 is provided with a so-called insert element or member 9 which is located in a housing seat 10 provided on the housing 6. The insert element 9 as part of the strain-relieve device 8 is fixed to the optical cable 2 by a crimp-ring 11 which is sealed together with the outer jacket 5 and the aramid-fiber 4 of the optical cable 2, so it will carry mechanical strength applied to the optical cable 2 in use of the optical module 7.

On a cylindrical portion 12 of the insert element 9 circular slots 13 and one or more longitudinal slots (not shown) are provided. The circular slots 13 may be separated from one another by a raised portions 14 of the insert element 9. On the circular and longitudinal slots the aramid-fibers 4 and the outer jacket 5 get pressed by the crimp-ring 11. This will protect the optical cable 2 against pulling and rotating. The one or more longitudinal slots facilitates mounting and/or potential demounting of the outer jacket 5 with the aramid-fibers 4 on the cylindrical portion 12 of the insert element 9.

The T-formed insert element 9 is received in the housing seat to hold the assembly 1. This ensures that functional components connected to the optical cable 2 and located inside the housing 6 are relieved from the mechanical strength.

Referring to FIG. 1, the optical fibers 3 are connected to an optical functional component 15 which, for example, is an optical receiver and/or an optical transmitter by a pluggable ferrule 16 provided on end portions 17 of the optical fibers 3.

In the assembly shown in FIGS. 1 and 2, a free fiber-length 18 of the optical cable assembly 1 is rather fixed and, therefore, should match with the distance between the housing seat and the optical functional component 15. Normally, the optical fibers 3 are provided with a length which is a little bit longer than the free fiber-length 18, and, therefore, could be bended in order to have tolerances compensated.

However, if the fiber-length provided between the end portions 17 of the optical fibers 3 and the insert element 9 is to short, it is not possible to correctly plug the ferrule 16 into the optical functional component 15. Depending on the inner construction of the optical cable 2 this has also only a tightly limited range.

Figure 3:
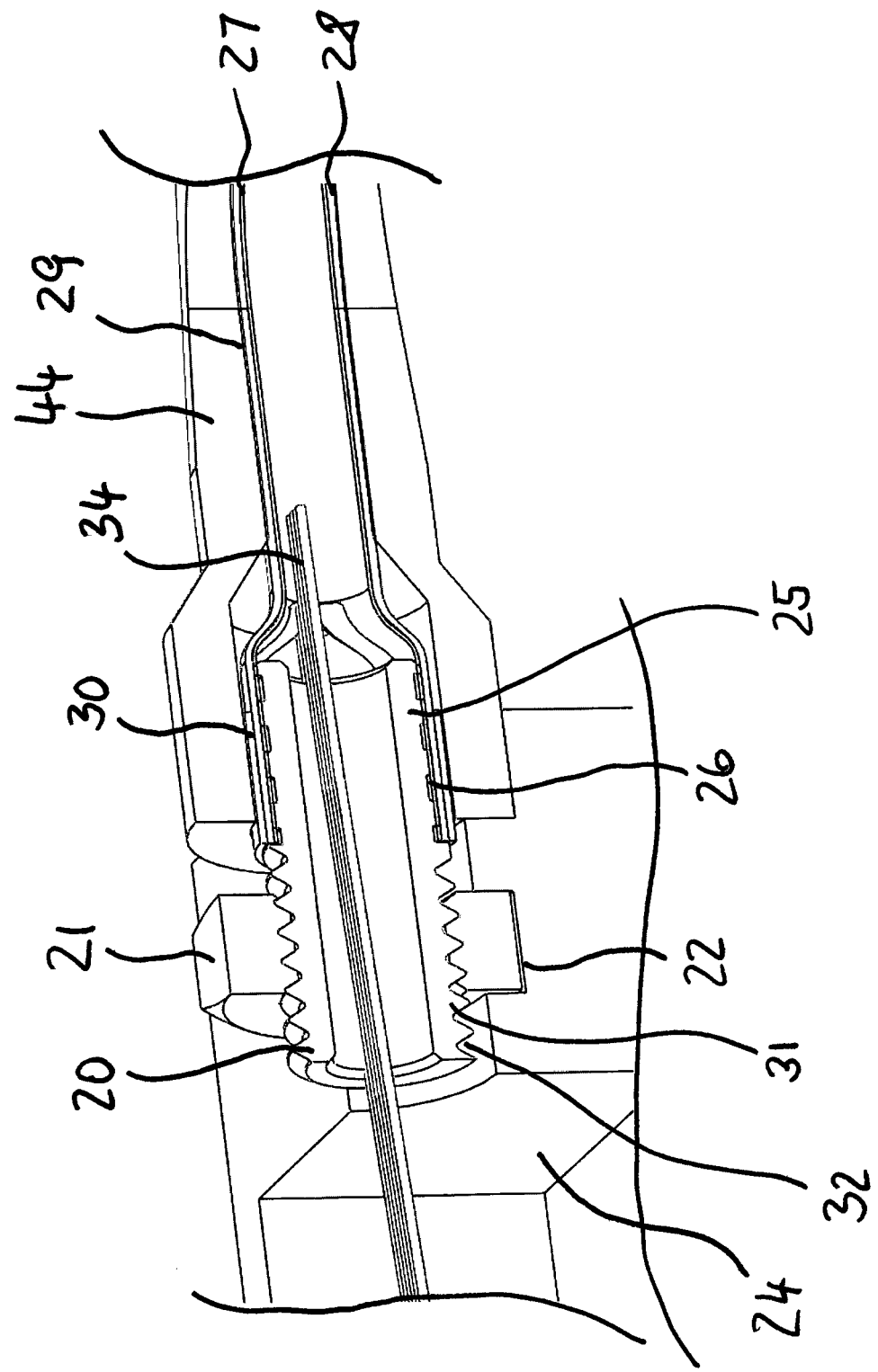
FIG. 3 is a perspective view of an example embodiment of an optical cable assembly connected to a housing.
Figure 4:
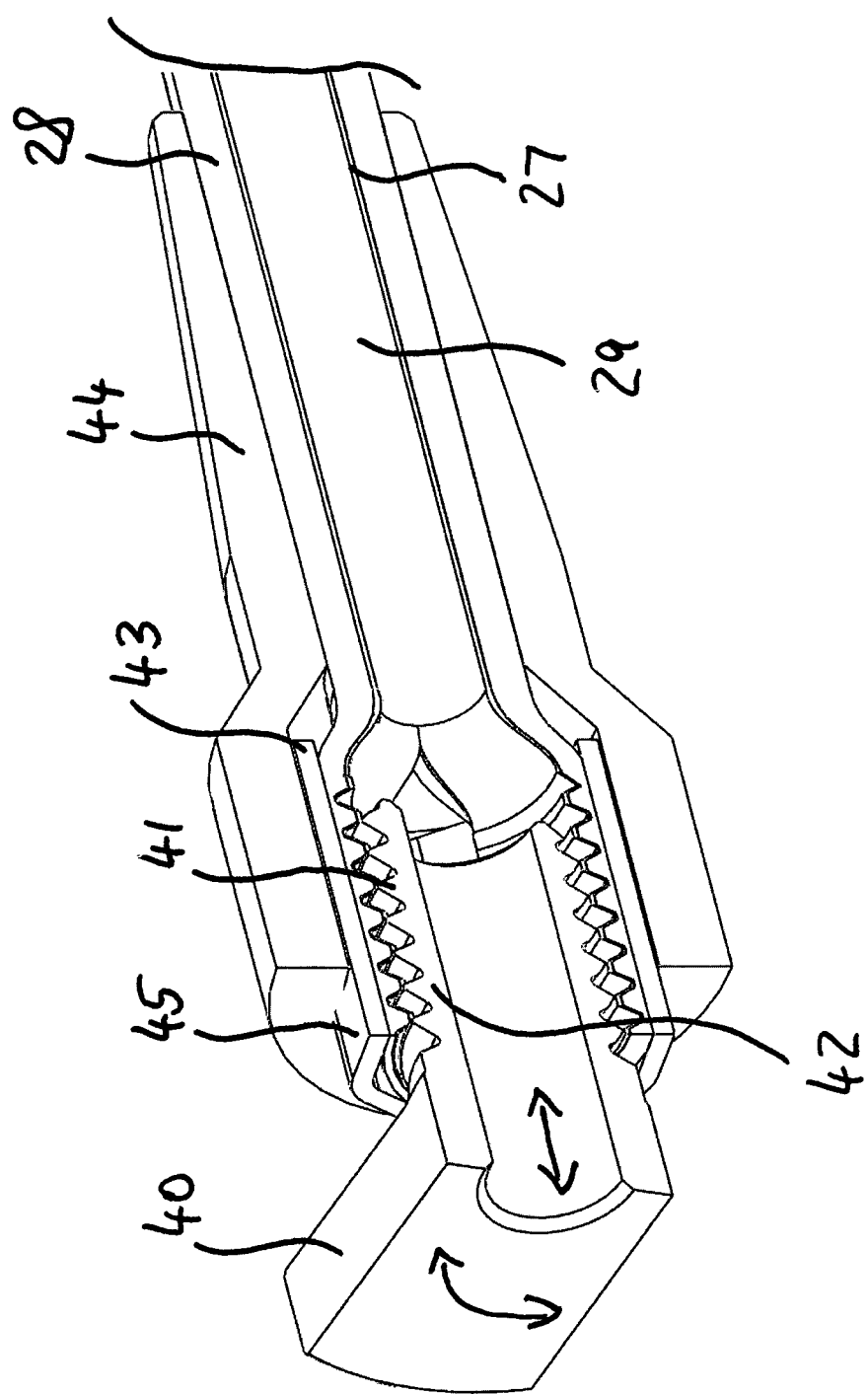
FIG. 4 is a perspective view of a further example embodiment of an optical cable assembly connected to a housing.

Referring to FIGS. 3 and 4, different example embodiments for an optical cable assembly are described.

In an example embodiment, compared to the assembly shown in FIGS. 1 and 2, the insert element 9 is replaced by a first element or member 20 and a second element or member 21 provided as part of an adjustment mechanism which, in this embodiment, may also be referred to as a screw-nut-assembly. The second member 21 is received in a housing seat 22 provided on a housing 23 of an optical module 24 (shown only in part for simplification).

On a back end part 25 of the first member 20 there are circular/longitudinal slots 26 comparable to the circular and longitudinal slots 13, 14 described above. The circular/longitudinal slots 26 provide for sealing to the aramid-fibers 27/the outer jacket 28 of the optical cable 29 with a crimp-ring 30.

On a front end 31 of the first member 20 there is a threaded portion 32 assigned to an inner threaded portion 33 of the second member 21. Adjustment is done by relative rotation movement of the first and second member 20, 21, respectively, thereby adjusting the distance between the first member 20 fixed on the optical cable 29 and end portions of optical fibers 34 of the optical cable 29 located inside the housing 23.

Such adjustment could be done before the second member 21 is inserted into the housing seat 22. After inserting the second member 21 is blocked from rotating because of the hexagonal surfaces which fits to the shape of the housing seat 22. To protect the crimped part of the optical cable 29 joined with the first member 20 from rotating a mechanical block is necessary that could be realized with an additional feature of the housing 23. For example, the assembly could be glued to the housing 23.

Referring to FIG. 4 showing another example embodiment, an insert-part 40 is provided with a thread 41 on a cylindrical portion 42. A crimp member 43 is located over the outer jacket 28 and the aramid-fiber 27 and, in the embodiment shown, is provided as a crimp ring. Due to crimping the outer jacket 28 is deformed, and a "nut" is built according to the insert-part-geometry for receiving the thread 41 of the insert-part 40. In the adjustment process done later, the insert part 40 can be screwed out, e.g. in half-turn steps, until it fits into the housing seat 22 (see FIG. 3).

The crimp member 43 at least in part is covered by an end barrel 44.

In order to protect the crimp member 43 from rotating a mechanical block may be provided and could be implemented by an additional feature of the housing 23. For example, a front end portion 45 of the crimp member 43 may be received in a housing opening (not shown), thereby, preventing rotation of the optical cable 2. Optionally, in addition to the features shown in FIG. 4, the insert-part 40 may provided with the combination of the first and second member 20, 21 rotatably supported as shown in FIG. 3. Such embodiment combines adjustment mechanisms disclosed in FIGS. 3 and 4.

The features disclosed in this specification, the figures and/or the claims may be material for the realization of the invention in its various embodiments, taken as such or in various combinations thereof.

The invention claimed is:

1. An optical cable assembly, comprising:
    an optical cable provided with one or more optical fibers,
    a strain-relieve device mounted on the optical cable and configured to provide a strain relieve when the optical cable is fed into an optical module through an opening in a housing of the optical module, the strain-relieve device comprising a first member and a second member being rotatable relative to each other;
    wherein the strain-relieve device is provided with an adjustment mechanism configured to adjust a distance between an end portion of the one or more optical fibers and the strain-relieve device,
    wherein the second member is blockable against rotation when inserted in the housing.

2. Assembly according to claim 1, wherein the end portion of the one or more optical fibers is received in a ferrule configured to be received in a plug-in of the optical module.

3. Assembly according to claim 1, wherein the adjustment mechanism is provided with a fine adjustment.

4. Assembly according to claim 1, wherein the adjustment mechanism is provided with a rotation adjustment mechanism.

5. Assembly according to claim 1, wherein the rotation adjustment mechanism is provided with a screw rotation adjustment mechanism.

6. Assembly according to claim 1, wherein
the optical cable is located a channel provided in the strain-relieve device, and
the strain-relieve device comprises an adjustment member which is, in relation to the end portion of the one or more optical fibers, movable along the longitudinal axis of the optical cable.

7. Assembly according to claim 6, wherein the adjustment member is pivotably supported.

8. Assembly according to claim 6, wherein the adjustment member is movably received on or in a cable jacket of the optical cable.

9. Assembly according to at least claim 6, wherein the adjustment member is movably received on a further member of the strain-relieve device which is fixed to the optical cable.

10. An optical module, comprising:
a housing,
a functional optical element received in the housing, and
an optical cable assembly according to claim 1, the optical cable assembly being fixed to the housing,
wherein the strain-relieve device is fixed to the housing, thereby feeding the optical cable into the housing through an opening in the housing.

11. A method for assembling an optical cable assembly, comprising steps of:
providing an optical cable comprising one or more optical fibers,
providing a strain-relieve device, the strain-relieve device comprising a first member and a second member being rotatable relative to each other, and mounting the strain-relieve device on the optical cable, where the strain-relieve device is configured to provide a strain relieve when the optical cable is fed into an optical module through an opening in a housing of the optical module, and
adjusting a distance between an end portion of the one or more optical fibers of the optical cable and the strain-relieve device by the adjusting mechanism,
wherein the second member is blockable against rotation when inserted in the housing.

12. Method according to claim 11, the method further comprising a step of fixing the adjusting mechanism after the step of adjusting the distance between the end portion of the one or more optical fibers of the optical cable.

13. Method according to claim 11, the method further comprising a step of mounting the optical cable assembly to an optical module by fixing the strain-relieve device to a housing of the optical module, thereby feeding the optical cable through an opening in the housing.

* * * * *